United States Patent Office 3,372,036
Patented Mar. 5, 1968

3,372,036
FOOD ANTIOXIDANTS
Robert W. Eitz, Media, Pa., assignor to Sun Oil Company, Philadelphia, Pa., a corporation of New Jersey
No Drawing. Filed Sept. 1, 1964, Ser. No. 393,730
14 Claims. (Cl. 99—150)

ABSTRACT OF THE DISCLOSURE

The specification discloses a process for stabilizing a foodstuff against oxidative deterioration. The specification also discloses a foodstuff composition containing an inhibitor against such deterioration. The process comprises incorporating into the fodstuff an inhibitor selected from the group consisting of the 2,3-enediols of 3-ketoglycosides and the higher fatty acid esters thereof. The inhibitor is a compound selected from the group consisting of 2,3-enediols of 3-ketomaltose, 3-ketosucrose, 3-ketolactose, 3-ketomaltobionic acid and 3-ketolactobionic acid and the fatty acid esters thereof.

---

This invention relates to novel compositions and methods for the preservation of foodstuff. More particularly, this invention relates to the use of enolic 3-ketoglycosides and esters thereof as food stabilizers and to compositions containing the same.

The use of food anti-oxidants which serve to stabilize foodstuffs against discoloration, off-tastes and aromas is well known in the art. Such compounds, by their presence, function by maintaining reducing conditions in food and thus preserve their taste and appearance. This is true not only of fatty or oily foods which tend to become rancid, such as olive oil, corn oil, butter, lard, and the like, but also aqueous-based foodstuffs such as fruits and fruit juices, carbonated beverages, fish, meat, beer and like materials which tend to become discolored and/or deteriorate.

It is an object of this invention to provide a novel inhibitor for foodstuffs which is effective in stabilizing both aqueous and non-aqueous foodstuffs. It is a further object of this invention to provide an anti-oxidant which is readily available from low-cost materials. It is still a further object of this invention to provide a method of preventing the discoloration and deterioration of foodstuffs without affecting their flavor or aroma by the addition of said anti-oxidant.

It has now been found, in accordance with the present invention, that these and other objects may be achieved through the addition of inhibitors selected from the group consisting of the enediol forms of 3-ketoglycosides and their corresponding higher fatty acid esters to unstabilized foodstuffs. In general, the free enolic ketoglycoside may be employed in aqueous materials, while the corresponding esters are, because of their solubility, more suitable for addition to fatty or oily food substances.

These enediols of 3-ketoglycosides are readily obtainable by the oxidation and tautomerization of certain common sugars or sugar acids, as for example, the disaccharides such as maltose, sucrose or lactose, or the bionic acids such as maltobionic acid or lactobionic acid. While chemical methods for oxidizing sugars to their corresponding 3-ketoglycosides are known, these methods are generally characterized by their low yields. However, means by which the oxidation may be achieved microbially have recently been reported whereby nearly stoichiometric conversions are obtained. Thus, for example, M. J. Bernaerts et al., have described in J. Gen. Microbiol., 22, 129–136 (1960); J. Micro. and Serology, 27, 247–256 (1961); and Nature, 197, 406–407 (1963), that 3-ketoglycosides are produced in high yield by the action of Agrobacterium sp. on disaccharides and bionic acids. The 3-ketoglycosides which may be prepared by this method includes such compounds as 4-(3-keto-α-D-glucosido)-D-glucose (hereinafter referred to as "3-ketomaltose"), derived from maltose; α-3-keto-D-glucopyranosyl - β - D-fructofuranoside (hereinafter referred to as "3-ketosucrose"), derived from sucrose; 4-(3-keto-β-D-galactosido)-D-glucose hereinafter referred to as "3-ketolactose"), derived from lactose; 4-(3-keto-α-D-glucosido)-D-gluconic acid (hereinafter referred to as "3-ketomaltobionic acid"), derived from maltobionic acid; 4-(3-keto-β-D-galactosido)-D-gluconic acid (hereinafter referred to as "3-ketolactobionic acid"), derived from lactobionic acid; and like compounds.

These 3-keto compounds are then conveniently tautomerized to their corresponding 2,3-enediol form under alkaline conditions at room temperature, or by boiling with strong acids such as sulfuric acid. Thus, for example, 3-ketolactose converts to its enediol form, when treated with dilute sodium hydroxide, as follows:

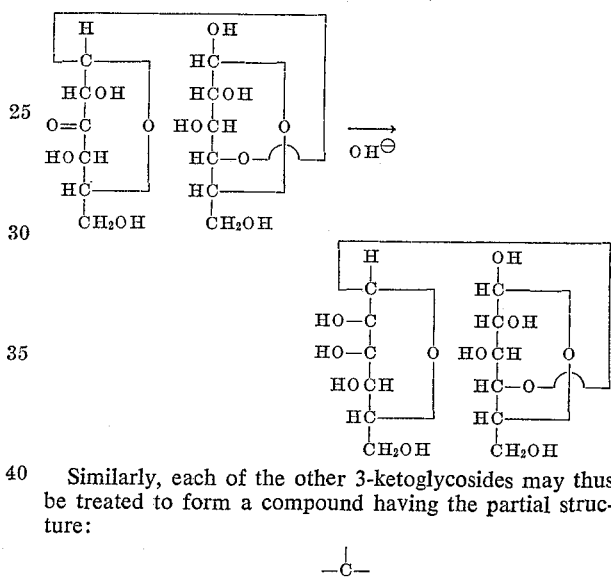

Similarly, each of the other 3-ketoglycosides may thus be treated to form a compound having the partial structure:

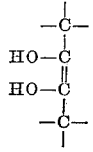

which structure possesses very strong reducing powers necessary to effectively stabilize foodstuffs.

While compounds of the foregoing partial structure will hereinafter be referred to as "2,3-enediols" it is understood that these compounds also encompass compounds having a 3,4-enediol arrangement since the structure of these highly complex molecules has not as yet been fully characterized.

These compounds, when employed in this form, are suitable for the stabilization and/or prevention of discoloration of such aqueous or dry foodstuffs as fruits, fruit juices, carbonated beverages, fish, meat, beer, milk and other dairy products, and like substances known by the food industry to require the presence of antioxidants. Use of the enediols of 3-ketoglycosides are especially advantageous in conjunction with the use of preparations containing vitamin C, since these enediols, when present in amounts in excess of the vitamin C, serve to spare the oxidation of this vitamin, which itself is a known reducing agent, and thus permit this material to retain its vitamin activity.

In a further embodiment of this invention, the 2,3-enediols of 3-ketoglycosides may be used to stabilize fatty, non-aqueous material such as cooking oils, shortening, mayonnaise, butter, and the like by converting the enediols to their corresponding fat-soluble esters. This may be achieved by a conventional esterification of the enediol compounds with higher fatty acids, their salts, or acyl halides thereof, having from 12 to 20 carbon atoms, such as lauric acid, palmityl chloride, myristyl chloride, stearic acid or oleic acid, to form fat-soluble esters which are particularly useful in preventing rancidity and discoloration in fatty or oily foods, especially during long periods of storage.

These enediol antioxidants and their esters may be added to foodstuffs in amounts varying from about 0.005% to 2.0% by weight of the food, preferably from 0.1% to 1.0%, and may be used alone or in combination with other food additives and/or suitable inert carriers. It will be understood, of course, that where above-average storage periods and unusual temperature conditions and the like prevail, the amount of antioxidant must be increased accordingly.

The following examples are intended for the purpose of illustration of the invention only and are not intended to limit the same. The 3-ketoglycoside enediols and their esters employed in these examples are prepared in the same or similar manner to the oxidation, tautomerization and esterification methods heretofore set forth.

*Example 1*

To the vegetable oil phase of 1 lb. of a commercial mayonnaise is introduced 2 gms. of the stearate ester of the 2,3-enediol of 3-ketolactose. The stabilized mixture is stored for 30 days at room temperature. At the end of that period, no rancid odor or taste is discernible. An equal amount of untreated mayonnaise stored for the same period of time under the same conditions has a markedly rancid flavor and undesirable odor.

*Example 2*

Ten pounds of steam-peeled peaches are sliced very thin and 3 gms. of the 2,3-enediol of 3-ketosucrose are added and mixed in thoroughly with the slices. The mixture is then frozen in sugar syrup; after ten days the peaches are examined and found to have retained their natural flavor and color when thawed. A corresponding amount of untreated sliced peaches, by comparison, is found to have turned brown and is unsuitable for consumption after three days.

*Example 3*

To one quart of bottled apple juice is added 700 mg. of the 2,3-enediol of 3-ketomaltobionic acid. The juice is stirred until the acid is dissolved, the bottle is capped, and refrigerated for 20 days. At the end of that time the juice is examined and found to be light amber colored, clear in appearance and suitable in taste. A corresponding untreated jar of apple juice is much darker in appearance with a brown sediment and unpalatable odor and taste.

*Example 4*

Into two five-gallon containers of olive oil is added 80 and 40 gms. respectively of the palmitate ester of the 2,3-enediol of 3-ketomaltose. The containers are sealed and stored at room temperature. At the end of two months, the contents of these containers and a like container of untreated olive oil are inspected. The olive oil containing 80 gms. of antioxidant is clear and odorless; the oil containing 40 gms. of the palmitate ester has a slightly rancid odor and is cloudy in apperance. The untreated oil is extremely rancid and contains a thick sediment.

*Example 5*

To 30 oz. of a commercial orange-flavored syrup is added 250 mg. of the 2,3-enediol of 3-ketolactobionic acid. The treated syrup is divided equally amongst 6 12-oz. bottles and sufficient carbonated water is added to fill each bottle. Two additional bottles containing no antioxidant are similarly made up and all eight bottles are conventionally capped and stored for 28 days at room temperature. When opened, the treated bottles have no odor or unusual taste and are bright-orange colored in appearance; the untreated bottles, however, contain a brownish sediment, are brownish-orange in color and are very flat tasting.

*Example 6*

Fifty pounds of chopped meat preparation used in making frankfurters are treated with one-half ounce of the 2,3-enediol of 3-ketolactose. This meat, together with a separate, untreated ten-pound portion are used to make up separate groups of cooked, cured frankfurters. These frankfurters are placed in an open, refrigerated display case lighted by artificial light. At the end of five days, the two groups are examined and it is found that the treated meat has retained a reddish, commercially acceptable color, while the untreated meat has a mottled, greyish-green appearance.

*Example 7*

To each of two one-quart bottles of commercial grape drink containing concentrated grape juice, water, dextrose, citric acid, flavoring and coloring agents is added 105 mg. of vitamin C (ascorbic acid). In addition, 700 mg. of the 2,3-enediol of 3-ketosucrose are introduced into one of the two bottles, which are then sterilized and stored at room temperature for one month. At the end of that period, the contents of both bottles are examined both for quality and vitamin C content. It is found that while the grape drink in both bottles is satisfactory in appearance and taste, that nevertheless, by the Sherman guinea pig assay method, the bottle containing just the vitamin C assays at 5.5 mg. of active vitamin, while the bottle containing both the vitamin C and the enolic 3-ketosucrose assays at 91 mg. of vitamin.

The invention claimed is:

1. A foodstuff normally subject to oxidative deterioration containing, as an inhibitor for said deterioration, a compound selected from the group consisting of the 2,3-enediols of 3-ketomaltose, 3-ketosucrose, 3-ketolactose, 3-ketomaltobionic acid, 3-ketolactobionic acid, and the fatty acid esters thereof.

2. An aqueous-based foodstuff normally subject to oxidative deterioration in storage containing, as an inhibitor for said deterioration, a deterioration-inhibiting amount of the 2,3-enediol of a 3-ketoglycoside selected from the group consisting of 3-ketomaltose, 3-ketosucrose, 3 - ketolactose, 3-ketomaltobionic acid and 3-ketolactobionic acid.

3. A foodstuff according to claim 2 wherein the 3-ketoglycoside is 3-ketomaltose.

4. A foodstuff according to claim 2 wherein the 3-ketoglycoside is 3-ketosucrose.

5. A foodstuff according to claim 2 wherein the 3-ketoglycoside is 3-ketolactose.

6. A foodstuff according to claim 2 wherein the 3-ketoglycoside is 3-ketomaltobionic acid.

7. A foodstuff according to claim 2 wherein the 3-ketoglycoside is 3-ketolactobionic acid.

8. A non-aqueous foodstuff normally subject to oxidative deterioration in storage containing, as an inhibitor for said deterioration, a deterioration-inhibitng amount of a higher fatty acid ester of the 2,3-enediol of a 3-ketoglycoside selected from the group consisting of 3-ketomaltose, 3 - ketosucrose, 3 - ketolactose, 3 - ketmoaltobionic acid and 3-ketolactobionic acid.

9. A foodstuff according to claim 8 wherein the 3-ketoglycoside is 3-ketomaltose.

10. A foodstuff according to claim 8 wherein the 3-ketoglycoside is 3-ketosucrose.

11. A foodstuff according to claim 8 wherein the 3-ketoglycoside is 3-ketolactose.

12. A foodstuff according to claim 8 wherein the 3-ketoglycoside is 3-ketomaltobionic acid.

13. A foodstuff according to claim 8 wherein the 3-ketoglycoside is 3-ketolactobionic acid.

14. A foodstuff containing ascorbic acid and normally subject to oxidative deterioration of both the foodstuff and the contained ascorbic acid, containing, as an inhibitor for said deterioration, a deterioration inhibiting amount of a 2,3-enediol of a 3-ketoglycoside selected from the group consisting of 3-ketomaltose, 3-ketosucrose, 3-ketolactose, 3-ketomaltobionic acid, 3-ketolactobionic acid and the higher fatty acid esters thereof in an amount which is in excess of the quantity of ascorbic acid present.

References Cited

UNITED STATES PATENTS

| | | | |
|---|---|---|---|
| 2,350,435 | 6/1944 | Wells et al. | 260—344.5 |
| 2,427,769 | 9/1947 | Ruskin | 167—81 |
| 2,694,719 | 11/1954 | Opplt | 99—155 X |
| 2,795,503 | 6/1957 | Dunshee et al. | 99—163 X |

OTHER REFERENCES

Bernaerts, M. J. et al.: "J. Gen. Microbiology," 22, 1960 pp. 137–146, pp. 137–139 relied on (1960).

MAURICE W. GREENSTEIN, *Primary Examiner.*